United States Patent [19]

Costin

[11] 3,933,484

[45] Jan. 20, 1976

[54] COBALT-BASE ALLOY

[75] Inventor: Darryl J. Costin, Columbus, Ohio

[73] Assignee: Owens-Corning Fiberglas Corporation, Toledo, Ohio

[22] Filed: May 31, 1974

[21] Appl. No.: 475,220

[52] U.S. Cl. ............................ 75/171; 65/1; 65/15; 65/374
[51] Int. Cl. ............................................ C22c 19/00
[58] Field of Search ....... 75/171, 170; 148/32, 32.5; 65/1, 15, 374

[56] References Cited
UNITED STATES PATENTS 3,592,638   7/1971   Freeman ............................. 75/171

Primary Examiner—R. Dean
Attorney, Agent, or Firm—Carl G. Staelin; John W. Overman; Philip R. Cloutier

[57] ABSTRACT

A cobalt-base alloy, particularly suitable for high temperature molten glass environments, and articles manufactured from the alloy, preferably by casting, are disclosed.

10 Claims, 2 Drawing Figures

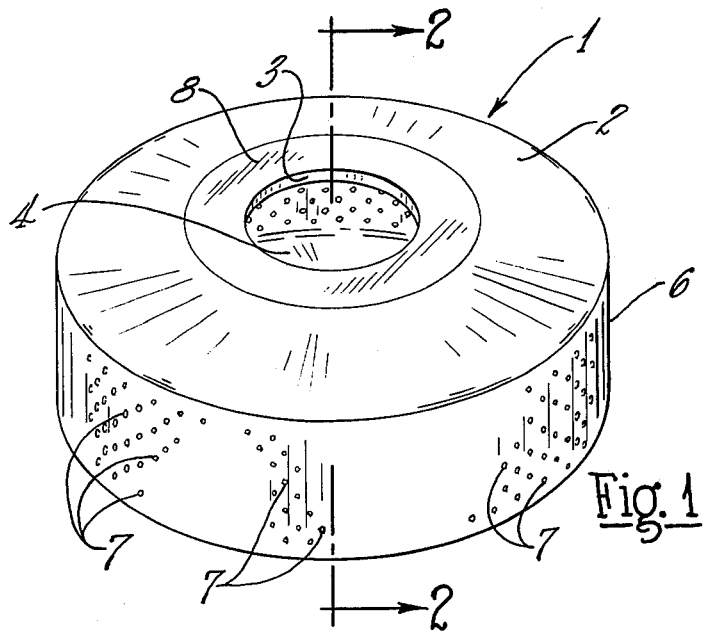
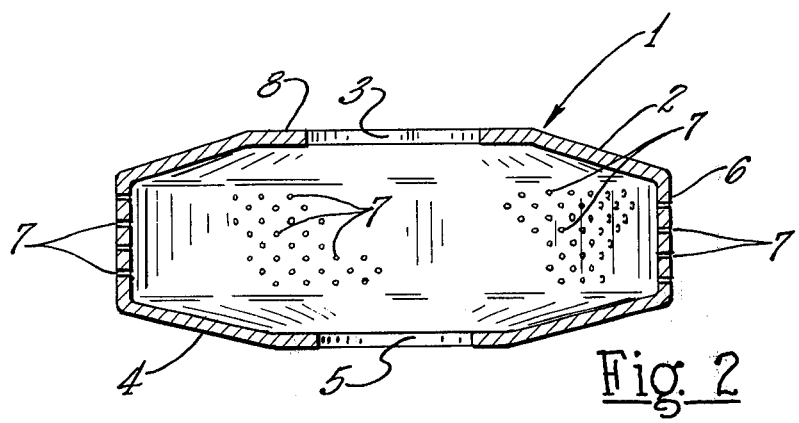

COBALT-BASE ALLOY

This invention relates to cobalt-base alloys particularly suitable for high temperature molten glass environments.

In one of its more specific aspects, the invention relates to articles manufactured from the alloys, particularly articles made by casting.

In certain industrial applications, there is a need for alloys which possess high rupture strength and high oxidation resistance at high temperatures. Among such applications are those involved, for example, in the glass fiber industry, where filaments are produced by passing a molten material, for example, glass, through the foraminous walls of a chamber adapted for rotation at high speeds, the chamber being known as a spinner, the filaments being emitted through the apertures of the wall due to the centrifugal action to which the molten material is subjected upon rotation of the spinner. Such spinners are usually operated when spinning glass fibers at temperatures of about 2,050°F and rotational speeds of about 1,700 RPM. Under these conditions, the alloy of this invention has been found to possess superior stress-rupture and creep properties and superior resistance to the molten glass environment to which it is subjected.

Accordingly, it is the object of this invention to provide a cobalt-base alloy having superior stress-rupture and creep properties, an alloy which can be air melted and air cast and which is particularly resistant to corrosion by molten glass.

According to this invention there is provided a composition of matter possessing the following approximate composition, the various components of this composition being expressed herein on a weight percent basis:

| Element | Approximate Composition, Weight % | | | |
|---|---|---|---|---|
| Chromium | About | 25. | to about | 36. |
| Nickel | About | 3.5 | to about | 13. |
| Wolfram | About | 3. | to about | 10.5 |
| Tantalum | About | 1.4 | to about | 6.5 |
| Zirconium | About | 0.005 | to about | 0.2 |
| Silicon | About | 0.05 | to about | 2. |
| Carbon | About | 0.35 | to about | 0.95 |
| Boron | About | 0.001 | to about | 0.1 |
| Iron | About | 0.01 | to about | 12. |
| Cobalt | Balance | | | |

In the above composition, the weight ratio of wolfram to tantalum will be within the range of from about 1 to about 5.5 and the weight ratio of zirconium to boron will be within the range of from about 0.05 to about 35.

The preferred composition of this invention will be approximately as follows, on a weight percent basis:

| Element | Approximate Composition, Weight % | | | |
|---|---|---|---|---|
| Chromium | About | 28.5 | to about | 33. |
| Nickel | About | 9.5 | to about | 11. |
| Wolfram | About | 5.5 | to about | 8. |
| Tantalum | About | 2.6 | to about | 4.4 |
| Zirconium | About | 0.009 | to about | 0.025 |
| Silicon | About | 0.25 | to about | 0.7 |
| Carbon | About | 0.5 | to about | 0.65 |
| Boron | About | 0.01 | to about | 0.035 |
| Iron | About | 0.25 | to about | 0.6 |
| Cobalt | Balance | | | |

In the preferred composition, the weight ratio of wolfram to tantalum will be within the range of from about 1.9 to about 3.5 and the weight ratio of zirconium to boron will be within the range of from about 0.25 to about 0.9.

The best mode of practicing the invention is represented by the following approximate composition on a weight percent basis:

| Element | Approximate Composition, Weight % |
|---|---|
| Chromium | About 31.2 |
| Nickel | About 10.4 |
| Wolfram | About 6.5 |
| Tantalum | About 2.8 |
| Zirconium | About 0.01 |
| Silicon | About 0.38 |
| Carbon | About 0.58 |
| Boron | About 0.03 |
| Iron | About 0.32 |
| Cobalt | Balance |

In the above composition, the weight ratio of wolfram to tantalum will be about 2.3 and the weight ratio of zirconium to boron will be about 0.3

The above compositions are not meant to preclude the presence of impurities which are inherently contained in the principal components previously set forth. However, these impurities should be limited to about 0.1 weight percent aluminum, about 0.1 weight percent titanium, about 0.015 weight percent sulfur and about 0.015 weight percent phosphorous.

The compositions of this invention can be prepared by air melting and air casting or by vacuum melting and vacuum casting according to recognized melt procedures for cobalt-base alloys, sometimes known as superalloys. Preferably the melt components are used in the form of master alloys to facilitate the melting of the high melting point elements such as wolfram, tantalum, chromium, zirconium, carbon and boron.

In the preferred method of producing the alloy, the original melt formed in the crucible will consist principally of chromium and cobalt. Thereafter, the remainder of the elements required can be introduced into the original melt in any order when the melt temperature is within the range of from about 2,700°F to about 2,800°F. As an alternate, however, all components of the composition can be introduced into the crucible with the cobalt and chromium. Inasmuch as zirconium and boron are contained in the composition in minimal amounts and certain weight ratios have been indicated desirable, it is preferred that the zirconium, boron, wolfram and tantalum be introduced into the melt immediately prior to pouring in order to prevent either the oxidation of these latter materials or their loss from the crucible. After the addition of these latter materials, the melt is heated to a temperature within the range of from about 2,800°F to about 3,025°F to produce a uniform composition at which temperature the melt is poured. The resulting castings can be welded and machined by conventional techniques. Preferably, the cast alloy will be heat treated at 1,950°F for 3 hours and then air cooled prior to further operations.

The following examples and comparisons illustrate the properties of the alloys of this invention. In all instances, comparison is made between a typical alloy of this invention and "Alloy A," a high nickel alloy which is the standard spinner production alloy used in spinner operations, not within the scope of this invention and having the following composition:

| Element | Approximate Composition, Weight % |
|---|---|
| Chromium | About 35 |
| Nickel | Balance |
| Molybdenum | About 3.0 |
| Carbon | About 0.25 |
| Tungsten | About 3.0 |
| Tantalum | About 1.0 |
| Silicon | About 1.2 |
| Iron | About 4.5 |
| Manganese | About 0.25 |

This alloy is claimed in U.S. Pat. No. 3,318,694 issued May 9, 1967 to Heitman.

The typical cast alloy of this invention, produced according to the preferred method outlined above, had the following composition:

| Element | Approximate Composition, Weight % |
|---|---|
| Chromium | 31.5 |
| Nickel | 10.3 |
| Wolfram | 6.4 |
| Tantalum | 2.4 |
| Zirconium | 0.01 |
| Silicon | 0.4 |
| Carbon | 0.64 |
| Boron | 0.04 |
| Iron | 0.38 |
| Cobalt | Balance |
| Wolfram/Tantalum | 2.7 |
| Zirconium/Boron | 0.25 |

Stress rupture property comparisons between "Alloy A" and the typical alloy of this invention, both air cast and heat treated, are as follows:

| Alloy | Stress Level, psi | Temperature, °F | Life Time, Hrs. |
|---|---|---|---|
| A | 1500 | 2050 | 110 |
| Invention | 1500 | 2050 | 8500 |
| A | 1500 | 2100 | 40 |
| Invention | 1500 | 2100 | 3000 |
| A | 1500 | 2055 | 100 |
| Invention | 1500 | 2268 | 100 |

Glass corrosion comparisons between "Alloy A", air cast and heat treated, and the typical alloy of this invention, air cast and heat treated, both alloys being partially immersed in the same molten glass at 2,170°F for a period of 40 hours were as follows:

| Alloy | Depth of attack, mils | |
|---|---|---|
| | Below Glass | At Airline |
| A | 5.95 | 17.4 |
| Invention | 2.80 | 11.7 |

As concerns creep, "Alloy A" had a total elongation of 18.9% whereas the typical alloy of the invention has a total mean elongation of about 5.6% under identical conditions.

Generally, the hardness of a typical alloy of this invention will be about as As Cast Hardness 108 Rockwell B Scale
    33 Rockwell C Scale
Heat Treated Hardness (3 hours at 1950°F.)
    111 Rockwell B Scale
    39 Rockwell C Scale As previously indicated, alloys of this invention are particularly suited for use in manufacture of spinners.

A combination of stress rupture and metal corrosion by molten glass limit the service life of spinners in operation.

One of the many types of cast spinners which can be fabricated employing the alloy of this invention is illustrated in the attached drawings in which FIG. 1 is a perspective view of the spinner and FIG. 2 is a sectional view of the spinner through section 2—2 of FIG. 1.

Referring now to these figures, in which like numerals represent like parts, there is shown spinner 1 fabricated in its entirety of the alloy of this invention.

Spinner 1 is comprised of an upper wall 2 having opening 3 therein and lower wall 4 having opening 5 therein. Continuous peripheral side wall 6 extends between upper wall 2 and lower wall 4 to form a substantially circular chamber. Side wall 6 is adapted with apertures 7 which penetrate the side wall and through which molten glass, introduced into the spinner through opening 3, is discharged.

As may apply in some spinner types, opening 3 can be adapted with flange 8 for connection to means, not shown, for rotating the spinner. The spinner can also be adapted with opening 5 for the extension therethrough of fluid introductory means, not shown.

Various spinners have been cast employing the alloys of this invention, the castings being heat treated and then machined to the desired dimensions. In actual plant trials, eight such spinners had an average service life of 252 hours whereas spinners cast and machined from the previously mentioned "Alloy A," under substantially identical conditions have an average service life of about 100 hours. In other plant trials, eight spinners produced from alloys of this invention had an average service life of 227 hours whereas spinners produced from "Alloy A," under substantially identical conditions have an average service life of about 101 hours. In still other plant trials, 10 spinners produced from alloys of this invention had an average service life of 230 hours whereas spinners produced from "Alloy A," under substantially identical conditions have an average service life of about 67 hours.

It will be evident from the foregoing that various modifications can be made to this invention. Such, however, are considered to be within the scope of this invention.

I claim:

1. A composition of matter consisting essentially of the following elements in amounts expressed in weight percent:

Chromium — from about 25 to about 36
Nickel — from about 3.5 to about 13
Wolfram — from about 3 to about 10.5
Tantalum — from about 1.4 to about 6.5
Zirconium — from about 0.005 to about 0.02
Silicon — from about 0.05 to about 2
Carbon — from about 0.35 to about 0.95
Boron — from about 0.001 to about 0.1
Iron — from about 0.01 to about 12
Cobalt — Balance the weight ratio of wolfram to tantalum being within the range of from about 1 to about 5.5 and the weight ratio of zirconium to boron being within the range of from about 0.05 to about 35.

2. The composition of claim 1 in which said elements are contained in the following approximate amounts, expressed in weight percent:

Chromium — from about 28.5 to about 33

Nickel — from about 9.5 to about 11
Wolfram — from about 5.5 to about 8
Tantalum — from about 2.6 to about 4.4
Zirconium — from about 0.009 to about 0.025
Silicon — from about 0.25 to about 0.7
Carbon — from about 0.5 to about 0.65
Boron — from about 0.01 to about 0.035
Iron — from about 0.25 to about 0.6
Cobalt — Balance the weight ratio of wolfram to tantalum being within the range of from about 1.9 to about 3.5 and the weight ratio of zirconium to boron being within the range of from about 0.25 to about 0.9.

3. The composition of claim 1 in which said elements are contained in the following approximate amounts expressed in weight percent:

Chromium — about 31.2
Nickel — about 10.4
Wolfram — about 6.5
Tantalum — about 2.8
Zirconium — about 0.01
Silicon — about 0.38
Carbon — about 0.58
Boron — about 0.03
Iron — about 0.32
Cobalt — balance the weight ratio of wolfram to tantalum being about 2.3 and the weight ratio of zirconium to boron being about 0.3.

4. The composition of claim 1 in which said composition contains up to about 0.1 weight percent aluminum, about 0.1 weight percent titanium, about 0.015 weight percent sulfur and about 0.015 weight percent phosphorous.

5. The composition of claim 1 which is air castable at a temperature within the range of from about 2,800°F to about 3,025°F.

6. The composition of claim 1 having a life of about 8,500 hours at stress-rupture conditions of about 1,500 psi. and 2,050°F.

7. The composition of claim 1 having an as cast hardness of 108 (Rockwell B Scale) and a heat treated hardness of 111 (Rockwell B Scale).

8. An article of manufacture produced by casting the composition of matter defined in claim 1.

9. An article of manufacture produced by casting and machining the composition of matter defined in claim 1.

10. A spinner comprised of the composition of claim 1, said spinner being comprised of foraminous walls and adapted for rotation.

* * * * *

UNITED STATES PATENT OFFICE
CERTIFICATE OF CORRECTION

Patent No. 3,933,484　　　　　　　　　　Dated　January 20, 1976

Inventor(s)　　　　DARRYL J. COSTIN

It is certified that error appears in the above-identified patent and that said Letters Patent are hereby corrected as shown below:

In Column 4, Line 55, with regard to zirconium, "0.02" should read

-- 0.2 --.

Signed and Sealed this

Second Day of May 1978

[SEAL]

Attest:

RUTH C. MASON
Attesting Officer

LUTRELLE F. PARKER
Acting Commissioner of Patents and Trademarks